United States Patent [19]

Ushiro et al.

[11] Patent Number: 5,502,607
[45] Date of Patent: Mar. 26, 1996

[54] RECORDING OR REPRODUCING APPARATUS

[75] Inventors: Tatsuzo Ushiro, Saitama; Kitahiro Kaneda, Kanagawa, both of Japan

[73] Assignee: Canon Kabushiki Kaisha, Tokyo, Japan

[21] Appl. No.: 201,048

[22] Filed: Feb. 24, 1994

Related U.S. Application Data

[63] Continuation of Ser. No. 927,547, Aug. 6, 1992, abandoned, which is a continuation of Ser. No. 262,610, Oct. 26, 1988, abandoned.

[30] Foreign Application Priority Data

Nov. 2, 1987 [JP] Japan .................................. 62-275869
Nov. 2, 1987 [JP] Japan .................................. 62-275870

[51] Int. Cl.$^6$ ................................................. G11B 15/60
[52] U.S. Cl. .......................................... 360/130.24; 360/84
[58] Field of Search ............................... 360/85, 95, 84, 360/130.21–130.24

[56] References Cited

U.S. PATENT DOCUMENTS

| | | | |
|---|---|---|---|
| T941,022 | 12/1974 | Freeman et al. | 360/130.24 |
| 3,428,524 | 2/1969 | Wilcox et al. | 360/107 |
| 3,911,490 | 10/1975 | Kostin et al. | 360/84 |
| 4,249,222 | 2/1981 | Iwasaki | 360/130.23 |
| 4,459,626 | 7/1984 | Branger | 360/84 |
| 4,511,943 | 4/1985 | Fechner | 360/130.23 |
| 4,641,214 | 2/1987 | Imanishi et al. | 360/84 |
| 4,686,597 | 8/1987 | Johnston | 360/130.24 |
| 4,833,562 | 5/1989 | Kochi et al. | 360/130.24 |
| 4,977,473 | 12/1990 | Arai et al. | 360/130.24 |

FOREIGN PATENT DOCUMENTS

| | | | |
|---|---|---|---|
| 0023908 | 2/1977 | Japan | 360/130.24 |
| 62-67760 | 3/1987 | Japan | 360/130.24 |

Primary Examiner—Stuart S. Levy
Assistant Examiner—Jefferson Evans
Attorney, Agent, or Firm—Robin, Blecker, Daley and Driscoll

[57] ABSTRACT

A recording or reproducing apparatus has a rotary head drum which is composed of a rotary drum with magnetic heads mounted on the outer periphery thereof and a stationary drum. It records a signal on or reproduces a signal from a magnetic tape by running the magnetic tape which is pulled around the predetermined portion of the outer peripheral surface of the rotary head drum. An angle varying member for varying the angle formed between the magnetic tape and the rotary head drum is provided at least at one of the locations where the magnetic tape enters and leaves the rotary head drum. Alternatively, a member for positioning the magnetic tape relative to the rotary head drum may be provided.

4 Claims, 7 Drawing Sheets

RECORDING OR REPRODUCING APPARATUS

This application is a Continuation of Ser. No. 07/927,547, filed Aug. 6, 1992, now abandoned; which is a Continuation of Ser. No. 07/262,610, filed Oct. 26, 1988, now abandoned.

BACKGROUND OF THE INVENTION

1. Field of the Invention

The present invention relates to a magnetic recording or reproducing apparatus for recording information on a magnetic tape or for reproducing information recorded on the magnetic tape using a rotary magnetic head.

2. Description of the Related Art

The development of video equipment such as video tape recorders (VTR) has been remarkable in recent years. In particular, in the field of VTRs, there has been an increasing demand for a reduction in size and weight thereof, as VTRs have grown in popularity.

Generally, the above-described VTR is of a helical scanning type which employs a rotary head drum. Compared with the other components of the helical scanning mechanism, the rotary head drum is large in volume and weight. Hence, reduction in the size of the rotary head drum is very important to achieving any reduction in the size and weight of the VTR itself.

A technique for reducing the size of the rotary head drum has been known, in which a magnetic recording pattern is obtained on a magnetic tape rotated at a speed of 2700 rpm using four heads. The magnetic recording pattern obtained in this technique is the same as that obtained when a rotary head drum having two heads on the periphery thereof is rotated for the NTSC system at a speed of 1800 rpm. The two heads are precisely 180° apart from each other in the latter technique.

Where $D_1$ is the diameter of the drum with two heads, the drum with four heads has a diameter $D_2$ calculated by the following equation:

$$D_2 = \tfrac{2}{3} \times D_1 \ldots \tag{1}$$

Thus, the diameter of the drum for the four head system can be reduced by 33% from that of the drum for the two head system.

In addition to the above-described head systems, a rotary head drum that can be employed for an 8 mm video tape recorder which uses a magnetic recording medium (a magnetic type) having a width of 8 mm is also known. The diameter of this rotary head drum is far smaller than that for the four head system.

Figure 1:
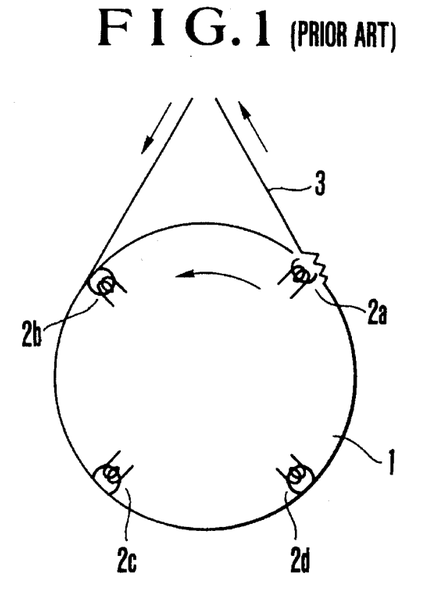
FIG. 1 illustrates generation of a non-uniform travel of a tape or of vibrations of the tape in a conventional magnetic recording or reproducing apparatus.

FIG. 1 shows a system for running a tape relative to the rotary head drum which is employed in a conventional magnetic recording or reproducing apparatus which may be a VTR. A rotary upper drum 1 which forms a rotary head drum has four magnetic heads 2a to 2d on the periphery. The magnetic heads 2a to 2d protrude slightly so as to press into the tape surface. The rotary upper drum 1 with the four magnetic heads is rotated at high speed by a known means (not shown). A magnetic tape 3 which is pulled around the rotary head drum by a known tape loading mechanism (not shown) travels in the direction indicated by the arrows. The tape 3 is in contact with the rotary head drum at a predetermined angle.

In the apparatus which employs the above-described rotary head drum, the rotary upper drum 1 which is the rotary head drum is rotated at extremely high speed compared with that at which the magnetic tape 3 is run, and the magnetic tape 3 is moved relative to the rotary upper drum 1 by means of an air film layer which is generated between the magnetic tape 3 and the rotary upper drum 1.

However, the conventional magnetic recording or reproducing apparatus of the above-described type suffers from a problem in that employment of a rotary head drum having a reduced diameter causes a reduction in the thickness of the air film layer generated in the gap between the magnetic tape and the rotary drum.

More specifically, the thickness AT of the air film layer is calculated as follows:

$$AT \alpha R(6\mu V/T)^{2/3} \ldots \tag{2}$$

where AT is the thickness of the air film layer, T is the tape tension, $\mu$ is the viscosity resistance, R is the radius of the drum, and V is the relative velocity. As is clear from the above-described equation, the thickness AT is proportional to the relative velocity V to the two-thirds power. In consequence, the thickness of the air film layer generated in an apparatus such as an 8 mm video tape recorder which employs a very small drum is particularly small. It is also to be noted that this tendency is greater with a rotary drum having four heads than with a drum having two heads.

As a result, if dust or dirt attaches to the surface of the rotary drum or of the tape, the air film layer is easily discontinued, deteriorating the stability with which the tape travels. A reduction in the thickness of the air film layer changes a state wherein the magnetic tape is in contact with the rotary drum where it leaves the rotary drum and where the tape tension is high, and this facilitates attachment of dirt to the rotary drum. It also increases the possibility of the magnetic tape being damaged and of deterioration in picture quality due to the generation of swinging of the screen.

Further, in the conventional apparatus shown in FIG. 1, the magnetic tape vibrates every time each of the heads makes contact with and leaves it while it is travelling. The tape also vibrates toward and away from the rotary head drum. However, when the intervals of the adjacent magnetic heads 2a to 2d are small, it is difficult for vibrations of the magnetic tape to be sufficiently damped and removed, making the travel of the tape unstable and degrading the head touch. These vibrations cause jitter or wow flutter during recording or reproduction, which adversely affects the image quality by generating time-base error, noise or swinging of the screen.

SUMMARY OF THE INVENTION

The present invention is directed to obviate the above-described problems of the conventional recording or reproducing apparatus. It is, therefore, a primary object of this invention to provide a recording or reproducing apparatus which ensures smooth travel of a tape that is pulled around a rotary head drum rotating at high speed.

It is a secondary object of the present invention to provide a recording or reproducing apparatus which ensures smooth and stable tape travel and head touch even when a rotary head drum employed has a small diameter.

To achieve these objects, the present invention provides, in one form, a recording or reproducing apparatus including a rotary drum with heads mounted on the periphery thereof in such a manner that they protrude, and a stationary drum which is disposed adjacent to the rotary drum, a tape-like recording medium which is pulled around the predetermined portions of the drums travelling so as to allow a signal to be recorded on or reproduced from the recording medium, which is characterized by the inclusion of an angle varying member for varying the angle at which the tape-like recording medium separates from the drums, the angle varying member being provided at least at one of the locations where the tape-like recording medium enters and leaves the drums.

In the present invention, an angle varying member is disposed at least at one of the locations where the movement of a magnetic tape relative to the drums starts and where contact of the magnetic tape with the drums ends. In consequence, the thickness of an air film layer can be set to an optimal value so as to enable the air film layer to be formed stably. This ensures a stable tape travel and excellent picture quality during recording or reproduction.

Also, it is an object of the present invention to provide a magnetic recording or reproducing apparatus which enables tape vibrations generated when a head makes contact with or separates from a magnetic tape to be diminished.

It is another object of the present invention to provide an improved tape running system which is capable of maintaining a travelling tape stably against a rotary head drum.

To achieve these objects, the present invention provides, in another form, a recording or reproducing apparatus including a rotary drum with heads mounted on the periphery thereof in such a manner that they protrude, and a stationary drum which is disposed adjacent to the rotary drum, a tape-like recording medium which is pulled around the predetermined portions of the drums travelling so as to allow a signal to be recorded on or reproduced from the recording medium, which is characterized by the inclusion of a tape supporting means for restricting the movement of the predetermined portion of the tape-like recording medium toward the drums.

In this invention, a magnetic tape is held by the tape supporting means in a state where it is separated from the drum stably without generating any fluctuation of the tension of the magnetic tape which is caused by the contact of the head with or separation of the head from the magnetic tape. In consequence, sticking of the magnetic tape to the head can be eliminated, and tape vibrations can be diminished.

This results in a reduction in the possibility of generation of time base error of a signal or noise.

Other objects and features of the present invention will become apparent from the following detailed description of the preferred embodiments thereof, taken in conjunction with the accompanying drawings.

DETAILED DESCRIPTION OF THE PRESENT EMBODIMENTS

A first embodiment of the present invention will be described below with reference to FIGS. 2 to 5.

Figure 2:
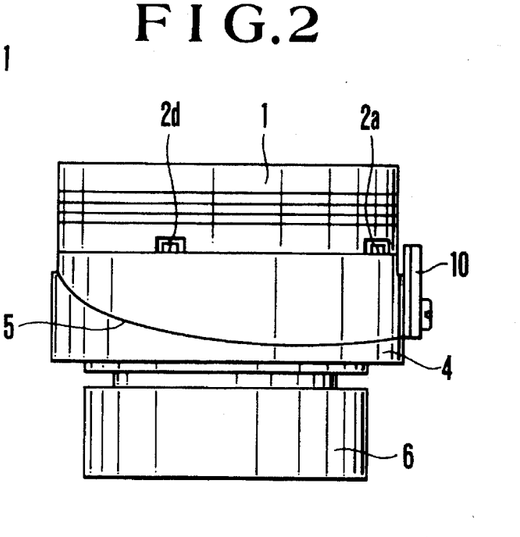
FIG. 2 is a front view of a magnetic recording apparatus, showing a first embodiment of the present invention.

Referring first to FIG. 2, a rotary upper drum 1 is mounted on a rotary shaft (not shown) of a motor 6 which is rotated at the speed required to conduct recording or reproduction with a specified format. Immediately below the rotary upper drum 1, a stationary lower drum 4 is fixed to a chassis (not shown) coaxially with respect to the rotary upper drum 1. The rotary upper drum 1 and the stationary lower drum 4 have substantially the same diameter. After having passed through the stationary lower drum 4, the rotary shaft of the motor 6 supports the rotary upper drum 1 in such a manner as to be rotatable with respect to the chassis.

The rotary upper drum 1 carries four magnetic heads 2a to 2d, mounted equiangularly on the lower edge thereof. The magnetic heads 2a to 2d protrude slightly from the notch formed at the lower edge of the rotary upper drum 1. They rotate together with the rotary upper drum 1. The peripheral surface of the stationary lower drum 4 is provided with a leading portion 5 for guiding the diagonal travel of a magnetic tape 3 relative to the moving locus of the heads, when the magnetic tape 3 is brought into contact with the rotary upper drum 1 and the stationary lower drum 4 in a helical fashion over a predetermined angle by a loading mechanism (not shown).

Figure 3:
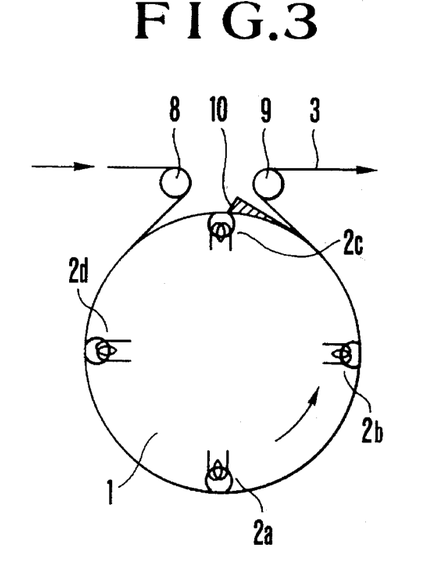
FIG. 3 illustrates the travel of a tape in the apparatus of FIG. 2.

The magnetic tape 3 is in contact with a rotary head drum, which is composed of the rotary upper drum 1 and the stationary lower drum 4, over about 270 degrees, as shown in FIG. 3. It travels in a state wherein the angle at which the magnetic tape 3 is in contact with the rotary head drum is maintained constant by travel restricting guide posts 8 and 9 which are respectively provided where the tape enters and exits the drum so as to load the tape into the drums. The travel guides 8 and 9 may be movable guide posts. An air film layer having a thickness obtained by Equation (2) is formed between the magnetic tape 3 and the outer peripheral surface of the rotary head drum so as to prevent the magnetic tape from making direct contact with the surface of the drum.

In addition, an angle varying member 10 for correctively adjusting the angle at which the magnetic tape 3 leaves the drum so as to make the thickness of the air film layer optimal is fixed to the stationary lower drum 4 by a screw.

Next, the operation of the thus-arranged recording or reproducing apparatus will be described.

Figure 5:
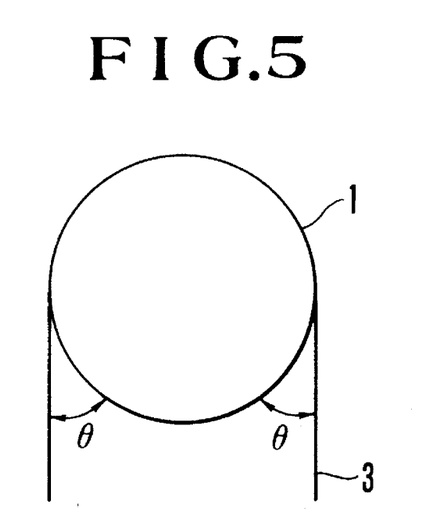
FIG. 5 illustrates the relationship between a drum diameter and an angle θ formed between the drum and a tape.

As is apparent from Equation (2), the radius R of the drum is an important factor in determining the thickness of the air film layer, because any reduction in the radius R of the drum causes a reduction in the thickness of the air film layer for the following reasons: reduction in the radius of the drum increases an angle θ formed between the drum 1 and the magnetic tape 3 (hereinafter referred to as a separation angle), as shown in FIG. 5, causing a rapid change in the tape tension. As a result, a reduced amount of air flows into the air film layer at the inlet side thereof, and the air film layer rapidly enlarges at the outlet portion, causing an increased amount of air to flow out of the air film layer and resulting in a reduction in the thickness of the air film layer. Variations or reduction in the thickness of the air film layer may cause discontinuity of the air film or generate a non-uniform air film, leading in turn to vibration or shifting of the magnetic tape.

After taking notice of the above-described fact, the present inventors proposed the present invention which involves provision of an angle varying member 10 which maintains the separation angle at more than a certain value where the tape enters the drum and at less than a certain value where the tape leaves the drum. More specifically, the present invention can be achieved by provision of a wedge-shaped angle varying member 10 at the end of the leading portion 5 formed on the stationary lower drum 4 where the tape exits the drum.

Figure 4:
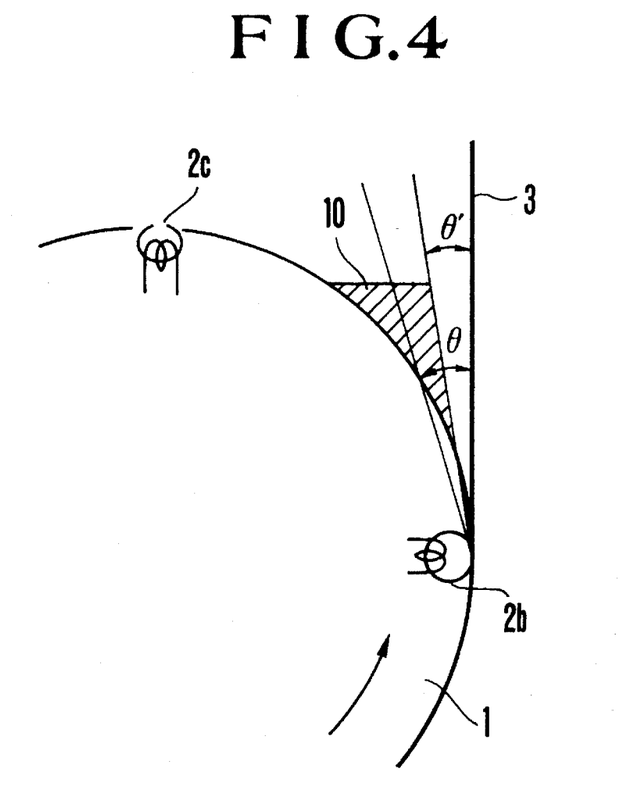
FIG. 4 illustrates adjustment of an angle by an angle varying member 10 of the apparatus of FIG. 2.
Figure 6:
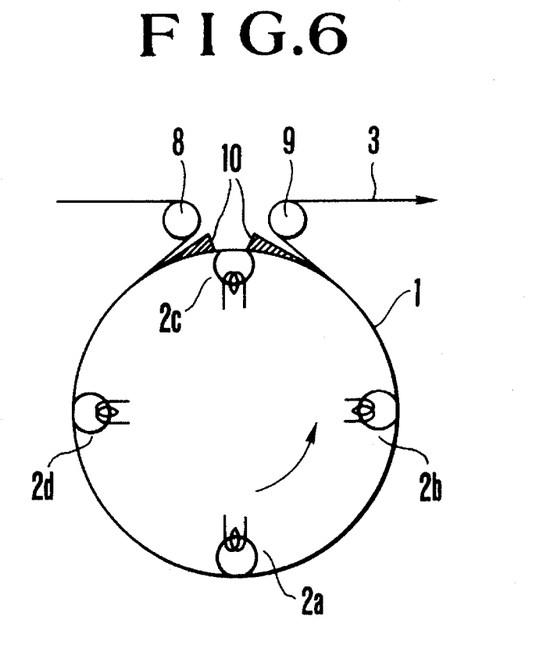
FIGS. 6 and 7 schematically illustrate a tape path, showing second and third embodiments of the present invention.
Figure 7:
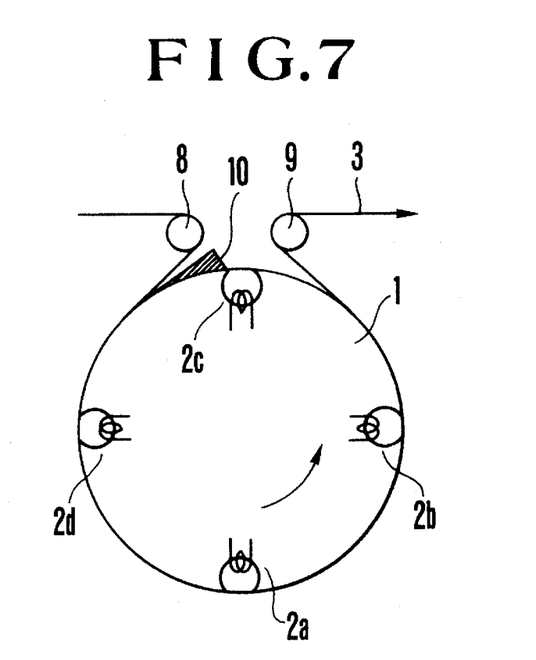

In the embodiment shown in FIGS. 3 and 4, the angle varying member is provided at the portion of the drum where the tape leaves the drum. However, the angle varying member may be provided at both the portion of the drum where the tape enters and that where it leaves the drum, as shown in FIG. 6. Alternatively, it may be solely provided at the portion of the drum where the tape enters the drum, as shown in FIG. 7.

As shown in FIG. 3, the magnetic tape 3 passes the travel restricting guide post 8 and then winds around the rotary head drum unit in helical fashion. More specifically, the magnetic tape 3 is angled downward as it first flows around the rotary upper drum 1, and then the stationary lower drum 4. Thereafter, the tape is conveyed via the travel restricting guide post 9. As shown in FIG. 4, the magnetic tape 3 leaves the stationary lower drum 4 at a separation angle θ' because of the provision of the angle varying member 10. The separation angle θ' is smaller than the separation angle obtained when no angle varying member is provided. This is equivalent to a case where an actual radius R obtained by Equation (2) has substantially increased to an effective radius R', and functions to increase the thickness of the air film layer, eliminating the various problems that are created by any reduction in the thickness of the air film layer.

Figure 8:
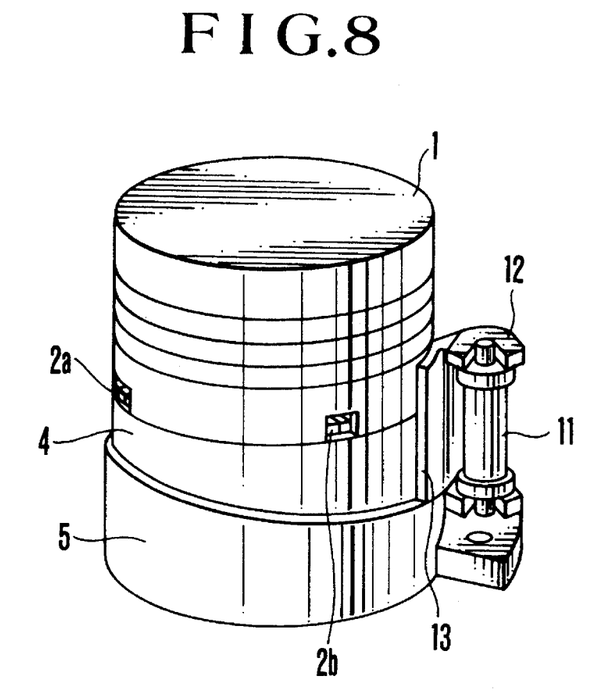
FIGS. 8 and 9 schematically illustrate a tape path, showing fourth and fifth embodiments of the present invention.

A fourth embodiment of the present invention will be described below with reference to FIG. 8. The same reference numerals are used to denote parts which are identical to those in the apparatus shown in FIG. 2, description thereof being omitted. In this embodiment, a movable guide post 11 is positioned where the tape leaves the drum to pull the tape around the rotary head drum. A similar movable guide post (not shown) is also provided where the tape enters the drum. The tape which is drawn from a cassette (not shown) is pulled around the rotary head drum by a known loading mechanism.

A post catching block 12 is fixed to a chassis (not shown) or to the stationary lower drum 4. It engages with the upper and lower portions of a supporting shaft of the movable guide post 11 when the tape is loaded into the apparatus, and thereby positions the movable guide post 11 so as to provide an accurate tape path suitable for the loading and unloading of the tape.

An angle varying member 13 for setting the tape separation angle is provided at the end portion of the post catching block 12 which is in contact with the stationary lower drum 4. The above-described arrangement of this embodiment ensures the same effect as that provided by the embodiment shown in FIG. 2.

Figure 9:
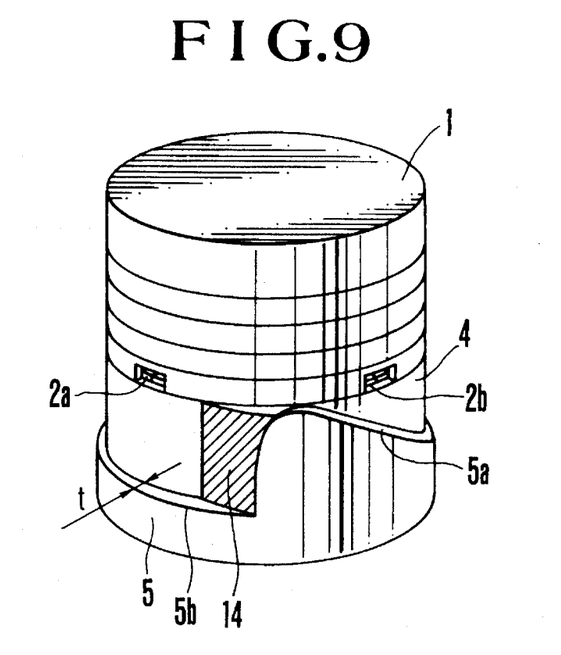

Turning to FIG. 9, a fifth embodiment of the present invention will next be described. In this embodiment, an angle varying member 14 is formed at part of the leading portion 5 for guiding the travel of the tape which is in contact with the rotary drum in helical fashion. The magnetic tape 3 moves diagonally relative to the direction in which the drum is rotated, and the height of the leading portion 5 is therefore greater at an inlet side 5a and less at an outlet side 5b. Further, the leading portion 5 is a machined shoulder formed on the surface of the stationary lower drum 4 along which the tape travels. Therefore, in this embodiment, the thickness t of the shoulder that forms the leading portion 5 is made sufficiently large, and the portion of the leading portion 5 which connects the inlet with the outlet is machined such as to form an inclined surface as the angle varying member 14. The above-described arrangement of this embodiment is effective in reducing the separation angle θ, as in the case of the above-described embodiments. In the embodiments shown in FIGS. 8 and 9, the angle varying member may be provided where the tape enters the drum or where the tape both enters and leaves the drum, as shown in FIGS. 6 and 7.

As will be understood from the foregoing description, in the present invention, since the angle varying member for reducing the separation angle is at least provided at one of the locations where the magnetic tape enters and leaves the drum, the thickness of the air film layer can be maintained at an optimum value, ensuring stable travel of the tape and excellent picture quality.

Next, embodiments which are effective in eliminating cling of the tape to the rotary head drum as well as variations thereof for stabilizing the tape travelling position will be described below with reference to FIG. 10, which is a front view of a sixth embodiment of the present invention, FIG. 11 which is a schematic cross-sectional view of the apparatus of FIG. 10, and FIG. 12 which is a cross-sectional view of a tape supporting member of the apparatus of FIG. 10. Like reference numerals designate parts which correspond to those of the above-described embodiments.

Figure 10:
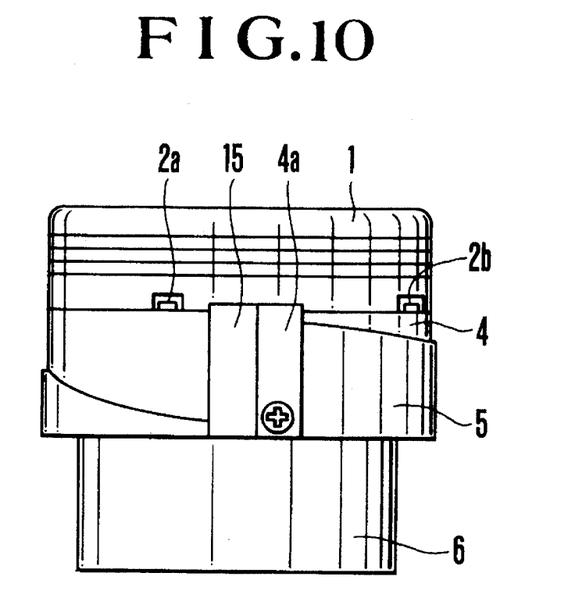
FIG. 10 is a front view of a magnetic recording apparatus, showing a sixth embodiment of the present invention.
Figure 11:
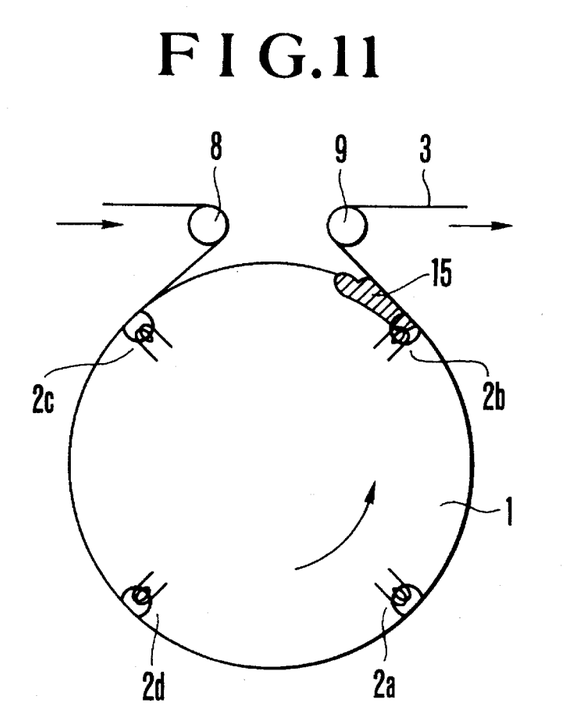
FIG. 11 is a schematic cross-sectional view of the apparatus of FIG. 10.
Figure 12:
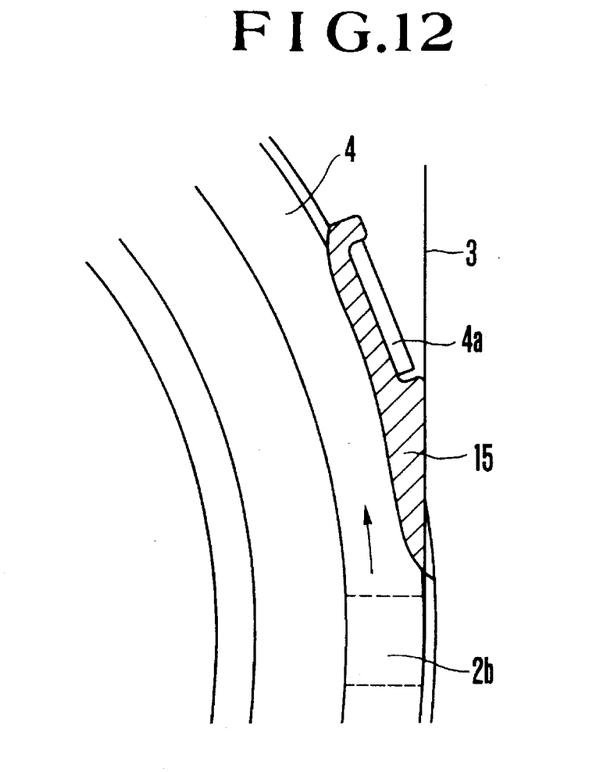
FIG. 12 is a cross-sectional view of a tape supporting member of the apparatus of FIG. 10.

Referring first to FIG. 10, the rotary upper drum 1 is rotatably disposed above the stationary lower drum 4 having the same diameter as that of the rotary upper drum 1. It carries the four magnetic heads 2a to 2d on the periphery thereof, as shown in FIG. 11. The magnetic heads 2a to 2d are precisely 90° apart from each other. They protrude slightly to press into the tape surface. The stationary lower drum 4 is fixed to a chassis (not shown) of an apparatus. The peripheral surface of the stationary lower drum 4 is provided with the leading portion 5 for guiding the magnetic tape 3 diagonally relative to a head rotating locus. The motor 6 is provided below the stationary lower drum 4, and the rotary shaft thereof extends through the stationary lower drum 4 to the center of the rotary upper drum 1 so as to support it.

Where the magnetic tape 2 leaves the stationary lower drum 4, a tape supporting member 15 is fixed to the stationary lower drum 4 through a mounting portion 4a by a screw, as shown in FIG. 12. The tape supporting member 15 has a wedge-shaped cross-section. The tape supporting member 15 is mounted on the portion of the stationary lower drum 4 where the leading portion 5 ends.

The travel restricting guide posts 8 and 9 are disposed near the drum assembly, which is composed of the rotary upper drum 1 and the stationary lower drum 4, so as to bring the magnetic tape 3 into contact with the drum assembly over a predetermined angle and thereby form a tape travel path. The inner surface of the magnetic tape 3 which leaves the drum via the travel restricting guide post 9 is in contact with the surface of the narrow end portion of the tape supporting member 15. In other words, the tape supporting member 15 is formed such that the two faces of the narrow end portion thereof meet in an angle which is substantially equal to that formed between the tape path and the rotary head drum, so as to bring the surface of the tape into contact with the narrow end portion.

In the thus-arranged embodiment, the magnetic tape 3 which is drawn out of a supply reel of a cassette (not shown) passes the travel restricting guide post 8, and is pulled around the rotary upper drum 1 and the stationary lower drum 4 in helical fashion over a predetermined angle while being guided by the leading portion 5 formed on the stationary lower drum 4. Thereafter, the magnetic tape 3 leaves the drum assembly, past the travel restricting guide post 9, and is reeled on a take-up reel of a cassette (not shown). Recording or reproduction of a signal is conducted while the magnetic tape 3 is moving relative to the four magnetic heads 2a to 2d mounted on the rotary upper drum 1.

Every time each of the magnetic heads 2a and 2d makes contact with or separates from the magnetic tape 3 while the tape 3 is travelling, the magnetic tape 3 is pulled in the direction in which the drum rotates, i.e., inwardly, against the tape tension, generating tape vibrations. However, provision of the tape supporting member 15 can eliminate the vibrations or cling of the tape to the drum, diminishing generation of time base error or noise. This makes provision of a stable tape running system possible.

Figure 13:
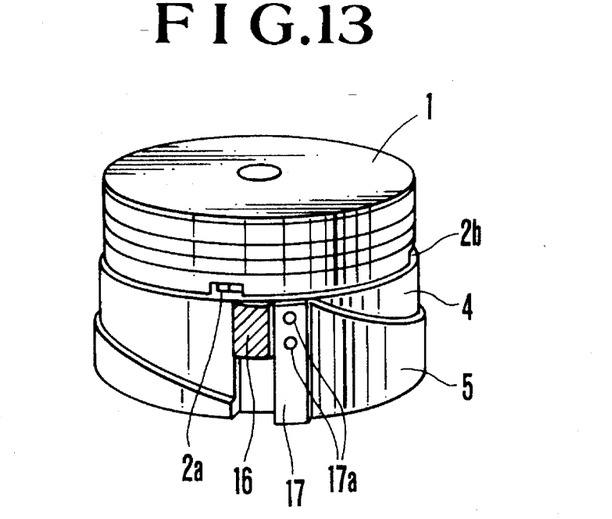
FIG. 13 is a perspective view of a recording or reproducing apparatus, showing a seventh embodiment of the present invention.

FIG. 13 is a perspective view of a drum assembly, showing a seventh embodiment of the present invention. Whereas in the embodiment shown in FIG. 10, the tape supporting member 15 is directly fixed to the stationary lower drum 4 by a screw, in this embodiment a tape supporting member 16 is mounted on a block 17 fixed to a chassis using an adhesive or the like. In order to facilitate the attachment of the tape supporting member 16 to the block 17, the block 17 has holes 17a for an adhesive.

This embodiment is suitable for a case wherein the tape supporting member 16 cannot be mounted directly on the side surface of the stationary lower drum 4. It provides for the same effect as that obtained by the embodiment shown in FIG. 10.

Figure 14:
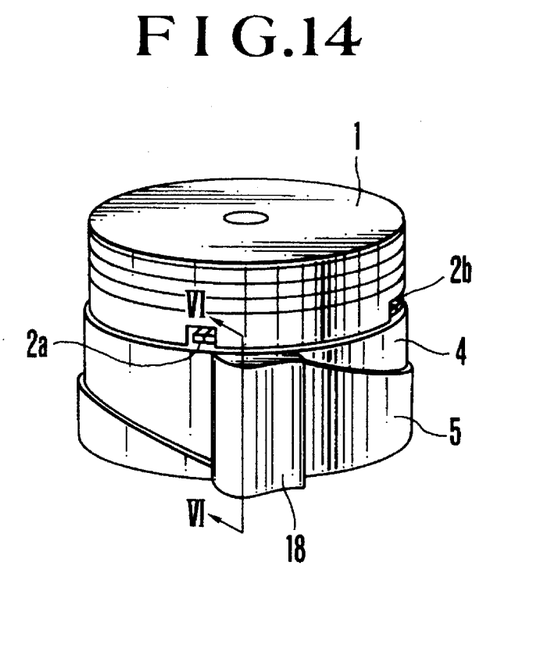
FIG. 14 is a perspective view of a recording or reproducing apparatus, showing an eighth embodiment of the present invention.

FIG. 14 is a perspective view of a drum assembly, showing an eighth embodiment of the present invention. Whereas in the embodiment shown in FIG. 10 the tape supporting member 15 is mounted on the surface of the leading portion 5, in this embodiment a tape supporting member 18 is fitted into a notch formed on the end of the leading portion on the stationary lower drum 4 and into a groove formed on the bottom surface thereof.

Figure 15:
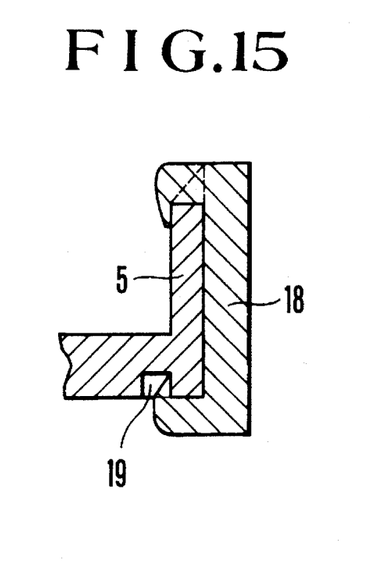
FIG. 15 is a section taken along the line VI—VI of FIG. 14.

More specifically, as shown in FIG. 15, the tape supporting member 18 has L-shaped protrusions at the upper and lower edges thereof, the protrusions being made to engage with the upper edge of the leading portion 5 and to fit into a recess (or a groove) 19 formed at the lower edge of the leading portion 5. In this way, the tape supporting member can be easily mounted on the drum assembly in a short period of time.

Figure 16:
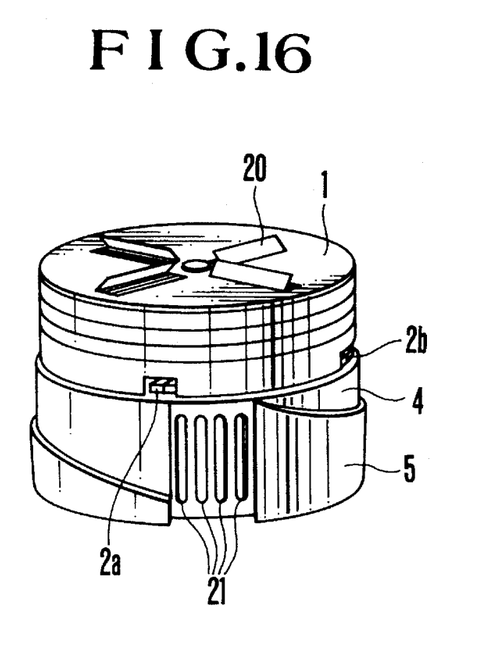
FIG. 16 is a perspective view of a ninth embodiment of the present invention.

FIG. 16 is a perspective view of a drum assembly, showing a ninth embodiment of the present invention. Whereas in the above-described embodiments, the space formed where the magnetic tape leaves the drum is filled by a member so as to make the tape travel along the surface of the member, this embodiment involves blowing of air towards the surface of the tape. In this way, cling of the tape to the drum due to a reduction in the pressure of the air in the gap between the tape and the drum can be prevented.

More specifically, fins 20 are mounted on the upper surface of the rotary upper drum 1 in radial fashion so as to send into the rotary upper drum 1 an amount of air which corresponds to the rotational speed, as shown in FIG. 16. Further, the escaping portion of the leading portion 5 is provided with air outlet slits 21 (which communicate with the openings of the fins 20) through which the air which has been introduced into the stationary lower drum 4 is blown out so as to protrude the magnetic tape 3 outwardly in accordance with the degree at which it is loosened. In this way, vibrations of the magnetic tape 3 which is leaving the drum can be prevented without bringing the member into contact with the tape.

In addition to the embodiment shown in FIG. 16, air inlet holes may be provided on the stationary lower drum 4 in such a manner that they communicate with the air outlet slits formed in the side surface thereof. In this way, the air pressure at the air outlet slits can be maintained at atmospheric pressure, and the magnetic tape 3 can be thereby floated so as to prevent vibrations thereof which are generated when the magnetic tape leaves the drum.

The above-described embodiments involve prevention of tape vibrations at a location where the tape leaves the drum. However, the tape supporting member may be provided where the magnetic tape enters the drum, as shown in FIG. 7. Alternatively, it may be provided where the magnetic tape both enters and leaves the drum, as shown in FIG. 6, so as to make prevention operation of tape vibrations a complete one.

What is claimed is:

1. A recording or reproducing apparatus including a rotary drum with heads mounted on the periphery thereof in such a manner that they protrude, and a stationary drum which is disposed adjacent to said rotary drum, said rotary drum being rotated to record a signal on or to reproduce a signal from a tape-like recording medium wrapped around predetermined portions of said drums and travelling at a predetermined speed, and movable tape guide means an improvement being characterized by the inclusion of a tape supporting member for restricting the movement of predetermined portions of said tape-like recording medium toward said drums, said tape supporting member being arranged to stabilize air in a space formed between said medium and said drums, said stationary drum being formed, on its outer peripheral surface, with lead means having a lead surface for guiding the tape-like recording medium, said lead means having a stopper at an end of said lead surface for affixing said tape supporting member in said apparatus, said movable tape guide means being positioned at the end of said lead surface by contact with said stopper.

2. A recording or reproducing apparatus according to claim 1, wherein said tape supporting member is provided at both ends of said lead surface.

3. A recording or reproducing apparatus according to claim 1, further including movable guide posts for determining the angle over which said tape-like recording medium is in contact with said rotary drum and said stationary drum, said movable guide posts being respectively provided at locations where said medium enters and leaves said rotary drum and said stationary drum.

4. A recording or reproducing apparatus according to claim 3, wherein said tape supporting member has a form which enables a gap between said rotary drum and said tape-like recording medium to be reduced.

* * * * *